US007996884B2

(12) United States Patent
Bleumer et al.

(10) Patent No.: US 7,996,884 B2

(45) Date of Patent: Aug. 9, 2011

(54) METHOD AND ARRANGEMENT FOR SERVER-CONTROLLED SECURITY MANAGEMENT OF SERVICES TO BE PERFORMED BY AN ELECTRONIC SYSTEM

(75) Inventors: Gerrit Bleumer, Schildow (DE); Clemens Heinrich, Berlin (DE); Dirk Rosenau, Berlin (DE)

(73) Assignee: Francotyp-Postalia AG & Co. KG (DE)

( * ) Notice: Subject to any disclaimer, the term of this patent is extended or adjusted under 35 U.S.C. 154(b) by 1056 days.

(21) Appl. No.: 11/076,133

(22) Filed: Mar. 9, 2005

(65) Prior Publication Data

US 2005/0209875 A1 Sep. 22, 2005

(30) Foreign Application Priority Data

Mar. 19, 2004 (DE) ........................ 10 2004 014 427

(51) Int. Cl.
*G06F 15/16* (2006.01)

(52) U.S. Cl. ........................................................ 726/6

(58) Field of Classification Search ...................... 726/6
See application file for complete search history.

(56) References Cited

U.S. PATENT DOCUMENTS

| | | | | |
|---|---|---|---|---|
| 4,831,554 | A | 5/1989 | Storace et al. | |
| 4,933,849 | A | 6/1990 | Connell et al. | |
| 5,233,657 | A | 8/1993 | Gunther | |
| 5,414,851 | A * | 5/1995 | Brice et al. | 718/104 |
| 5,699,415 | A | 12/1997 | Wagner | |
| 5,742,683 | A * | 4/1998 | Lee et al. | 705/60 |
| 5,852,813 | A | 12/1998 | Guenther et al. | |
| 6,009,417 | A * | 12/1999 | Brookner et al. | 705/410 |
| 6,041,704 | A | 3/2000 | Pauschinger | |
| 6,064,993 | A * | 5/2000 | Ryan, Jr. | 705/403 |
| 6,148,292 | A | 11/2000 | Reisinger et al. | |
| 6,587,843 | B1 | 7/2003 | Gelfer et al. | |
| 6,698,953 | B1 * | 3/2004 | Hertlein | 400/103 |
| 6,775,656 | B1 | 8/2004 | Gettwart et al. | |
| 6,820,065 | B1 * | 11/2004 | Naclerio | 705/401 |
| 6,820,066 | B1 | 11/2004 | Reisinger et al. | |
| 7,103,583 | B1 | 9/2006 | Baum et al. | |
| 2001/0042052 | A1 * | 11/2001 | Leon | 705/401 |
| 2001/0042053 | A1 | 11/2001 | Wagner et al. | |
| 2002/0083020 | A1 | 6/2002 | Leon | |
| 2002/0104023 | A1 * | 8/2002 | Hewett et al. | 713/201 |

(Continued)

FOREIGN PATENT DOCUMENTS

DE 198 18 708 11/1999

(Continued)

*Primary Examiner* — Nasser Moazzami
*Assistant Examiner* — Michael S McNally
(74) *Attorney, Agent, or Firm* — Schiff Hardin LLP

(57) ABSTRACT

An arrangement for providing data in the context of security management for a franking system has a remote data center at which a list of data sets is stored the data sets containing security information as well as information regarding associated security policies, appertaining at least to security measures and the location of their storage in the franking system. A method for server-controlled security management of performable services in an electronic system includes the steps of receiving a request for a desired service, determining a security feature to be selected and generating a data set corresponding thereto, selecting a logical channel and transferring to data set via that channel establishing the service end, and waiting for receipt of a further service request or for the ending of the communication connection.

17 Claims, 2 Drawing Sheets

U.S. PATENT DOCUMENTS

2003/0097337 A1* 5/2003 Brookner et al. ............... 705/60

FOREIGN PATENT DOCUMENTS

| | | |
|---|---|---|
| DE | 198 30 055 | 12/1999 |
| EP | 0 948 158 | 10/1999 |
| EP | 0 992 947 | 4/2000 |
| EP | 1 103 924 | 5/2001 |
| WO | WO 99/48053 | 9/1999 |
| WO | WO 2004/001617 | 12/2003 |

* cited by examiner

METHOD AND ARRANGEMENT FOR SERVER-CONTROLLED SECURITY MANAGEMENT OF SERVICES TO BE PERFORMED BY AN ELECTRONIC SYSTEM

BACKGROUND OF THE INVENTION

1. Field of the Invention

The present invention concerns a method for server-controlled security management of performable services and an arrangement to provide data according to a security management for an electronic system. The invention is particularly suitable for franking machines and for other mail processing apparatuses that implement a service provided by a remote data center in communication with the franking machine.

2. Description of the Prior Art

The franking machine JetMail© that is commercially available from Francotyp-Postalia AG & Co. KG, is equipped with a base and with a removable meter. The latter is operationally connected with a static scale integrated into the base housing and is also used for, among other things, postage calculation. In connection with the service of downloading a postage tariff table, no particular security measures are implemented even though the correctness of the postage calculation is based on the aforementioned table and even though the meter contains a security module equipped with a cryptographic unit. The latter serves only to secure the postage fee data to be printed. Moreover, the meter contains a controller to control the printing and to control peripheral components of the franking machine. The base contains a postal item transport device and an inkjet printing device to print the postage value stamp on the postal item. An exchange of the print head is unnecessary since the ink tank is separate from the print head and can be exchanged. Also, no particular security measures have to be taken for the print head or for protection of the activation and data signals when a security imprint with a marking that provides a verification of the validity of the security imprint (U.S. Pat. No. 6,041,704) is printed with a special piezo-inkjet print head. In addition to the service of the downloading of a postage tariff table and a known service of a tele-postage data center, such as the downloading (U.S. Pat. No. 5,699,415 and European Application 689 170) of a credit from which the franked postage value can be debited before the printout, a further service can also be available in the base tracking. To prevent possible falsification by manipulation of the printing unit, i.e. in particular when the base with the printing unit can be separated from the meter, the postal authority is interested in information about the location of the printing unit when the base is again operated with a meter. Given base tracking, authorization ensues only of a printing unit that can be identified by the data center by an identification code (European Application 1 154 381).

In franking machines commercially available from Francotyp-Postalia AG & Co. KG—for example in Mymail®) and Ultimail® bubblejet print heads are used in the printing module. The ink tank and bubblejet print head are integrated into an exchangeable ink cartridge as is, for example, known from the ½-inch ink cartridge of the firm Hewlett Packard (HP). Contacting of the electrical contacts of the print head of the exchangeable ink cartridge can ensue via a connector of a conventional pen driver board by the firm HP. Both the postal authority and the customer have a heightened interest in a high evaluation security of the marking printed on the postal piece. A further service of the data center therefore can be piracy protection. In addition to the data enabling piracy protection, for example a code of the print head can be queried via the connector and sent to the data center via modem. The data center then effects a code comparison with a reference code stored in a database and transmits a message about the result of the check to the franking machine (European Application 1 103 924).

The security module is involved in a different manner with such services such as when, in the communication, security-relevant data must be exchanged with a remote data center over an unsecured data transmission path with a remote data center. The meter housing or the housing of a franking machine offers a first protection against fraudulent manipulations. An encapsulation of the security module by means of a special housing offers an additional mechanical protection. Such an encapsulated security module corresponds to the current postal requirements and is subsequently also designated as a postal security device (PSD). In some countries, the credit downloading requires security measures that only a PSD can provide. The franking machines offered by Francotyp-Postalia AG & Co. KG are connected in a known manner with a tele-postage data center for telephonic credit downloading and can be expanded with further devices in a franking system.

In addition to the positive remote value specification in the credit downloading cited above, a negative remote value specification given a refund of the remaining residual credit of the customer is known (European Application 717 379 and U.S. Pat. No. 6,587,843).

Moreover, loading of data not serving for credit loading before an initial operation of a franking machine is known from U.S. Pat. No. 5,233,657.

The use and transfer of machine-specific and customer-specific data set from a data center to a franking apparatus is known from European Application 1 037 172. The data set includes at least temporary and local data valid at the franking site that are retrievably stored in the data center associated with a number code in a database. The customer who has acquired a pre-initialized franking apparatus via a sales distribution should therewith be able to completely operate the franking apparatus without customer service or a service technician having to be called and without a visit to the post office. The data stored in the data center are subject to all of the same security measures. Independent of this, in the franking machine the graphic data are stored in a memory of the motherboard of the franking machine without further security measures. The graphic data can pertain to a stamp image, for example the city stamp.

A telephonic communication for the exchange of advertising stereotypes has been proposed in U.S. Pat. No. 4,831,554.

A date-dependent exchange of stamp images (with city stamp and with value stamp), which is loaded by modem at an earlier point in time, is disclosed in U.S. Pat. No. 4,933,849.

According to European Application 780 803, after an initialization it is possible for messages or carrier-specific advertising to be provided by a data center when an instruction for this is present in the data center. For this purpose, the customer must have previously agreed to a contract with the service provider or the operator of the data center.

From European Application 1 067 482, it is known to associate different security levels with the elements of a print image to be printed. These different security levels correspond to the different assignable authorization in order to individually change the elements. For authorization and downloading of the elements to change the print image, chip cards are used that validate the elements according to a special hierarchy.

A different service of a postal carrier exists in connection with a statistical classification of the franked mail according to statistical classes (European Application 892 368). Solutions to store data by the use of an end device are known from European Application 992 947 and European Application 1 001 383, according to which the registrations according to statistical classes (class of mail) are stored until the remote data center accesses them in order to query or to determine the user profile.

Furthermore, it is known that a remote data center can exchange security data via a modem with a franking system that has a postal security device (PSD). Such franking systems of Francotyp-Postalia AG & Co. KG known under the names Jetmail® and Ultimail®.

SUMMARY OF THE INVENTION

An object of the present invention is to provide an arrangement and a method that allow both the franking system and the postal security device to store and process security data.

The invention proceeds from the assumption that an operated data center authorized by the manufacturer is secured against manipulations and thus security also exists for remote services that a franking system can use. For the future it is not excluded that, in addition to a franking machine, further or, respectively, different devices of a franking system also will be using services of a remote data center. When security information that is to be stored and processed in the form of data sets is mentioned in the following, this encompasses security requirements for the individual remote services that may be very different or even lacking in part in some countries.

In accordance with the invention a remote data center has a list of data sets that contain security information and an associated security category. The latter contains information that are recorded, processed, transferred and provided by the security management system of the data center according to a stored security policy (protocol), at least regarding security measures and/or regarding the site of the storage in the franking system. Both items of information are typically stored in a database of a database management system (DBMS). The security politics define, for each security category:

a) that a storage location for a desired data set within or outside of the PSD of the franking system is used, and/or
b) in which manner the transferred data are secured upon data exchange, and/or
c) which elements of the franking system are influenced by the transferred data.

The data set can be transferred as a result of the request of a service from a remote data center to the franking system, and the data set contains in its header the information regarding the associated security policy. A desired data set equipped with a header associated with the respective security category can be transferred by a transfer arrangement, for example wirelessly or via modem, from the data center to the franking system, and there be stored internally in the PSD or external of the PSD.

A method for a server-controlled security management of performable services in accordance with the invention is characterized by the following steps:

A) taking calls given communication connection between franking machine or an electronic system and data center, with automatic dial-up by the franking machine or the system into the data center and reception of the request of a desired service by means of a server of the data center,
B) determination of the security data and security category associated with this service in the database management system of the data center, control of a selector of the server corresponding to the respective security category, and generation of a data set with service data and security data by the server,
C) selection of the appertaining logical channel controlled by the selector of the server of the data center, and transfer of the data set corresponding to the desired service via the already-established communication connection between franking machine or system and the data center,
D) establishment of the logical connection to the franking machine or the system by the server of the data center as soon as the service is ended, and receipt of a corresponding authentication output by the franking machine or, respectively, system, and
E) waiting for the receipt of a further service request at the server, or for the ending of the communication connection, whereby the ending ensues via the franking machine or the system.

As a logical channel, either an unsecured channel or a secured channel is automatically formed in order to transfer a selected data set to the franking machine or system.

The appertaining data set also can be queried or read out again in the operation of the franking system. By the specification of a security category, it can be determined whether the desired data set is read from the franking system from within or outside of the PSD.

The arrangement to provide data according to a security management for a franking system assumes that a remote data center provides the data sets (which contain application data and data regarding security information) required by the franking system. In accordance with the invention the data center has a server that is in operational connection at least with a server communication unit and with a database management system. The requested data sets contain data for a security category (the latter containing at least information regarding security measures for a data exchange between the franking system and data center and/or regarding location of the storage in the franking system that) that are registered, processed, transferred and provided by the database management system of the data center according to a stored security policy. The franking system has a microprocessor that is connected at least with a postal security device, with a first non-volatile storage and with a communication unit to receive the required data sets. The microprocessor is programmed to evaluate the data for a security category in order to form a corresponding logical channel and to establish the location of the storage of the application data in the franking system.

Furthermore, the microprocessor is programmed for storage of the application data and the first non-volatile storage or a second non-volatile storage is fashioned to store the application data, with only the second non-volatile storage is a component of the postal security device (PSD). Moreover, a third non-volatile storage external to the franking machine can be arranged in another postal device, connected with the franking machine that is fashioned to store the application data.

DESCRIPTION OF THE PREFERRED EMBODIMENTS

Figure 1:
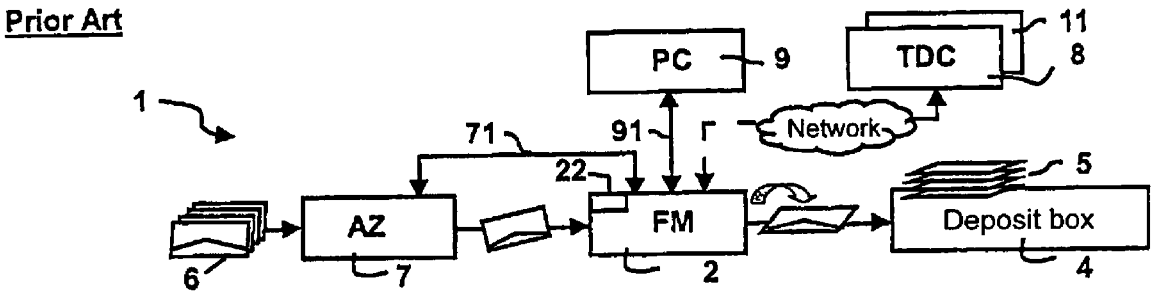
FIG. 1 is a block diagram of the basic components of a known franking system.

FIG. 1 is a block diagram of the basic components of a known franking system 1, comprised of a franking machine 2 to which are connected downstream (in postal terms) a deposit box 4 and upstream (in postal terms) an automatic supply station 7. In the franking system of the type Jetmail®, a stack 6 of mail pieces standing on edge is supplied to the supply station 7. A stack 5 of mail pieces can be removed from the deposit box 4. The automatic supply station 7 and a personal computer 9 are electrically connected to a first and second interface of the franking machine 2 via cables 71 and 91. The franking machine 2 can be communicatively connected with a remote tele-postage data center 8 for the purpose of credit downloading and with a remote service center 11. The franking machine 2 has an internal, static scale 22 and is equipped with means for postage fee calculation. A current postage fee table can be transferred from the remote service center 11 to the franking machine 2 or to the franking system 1. The franking system can optionally have a dynamic scale (not shown) that can be arranged between the automatic supply station 7 and the franking machine 2. A further known franking system of the type Ultimail®, in principle likewise corresponds to the block diagram shown in FIG. 1, with the difference that the stack 6 of mail pieces is supplied lying flat to the automatic supply station 7 and thus no dynamic scale upgrading is possible.

According to the known arrangement (FIG. 1), the contacted data center can perform only one service or only a minimal number of services without security features, but with an inventive data center a number of services with security features can be supplied. A further advantage is the avoidance of making a number of calls at different data centers with different telephone numbers.

Figure 2:
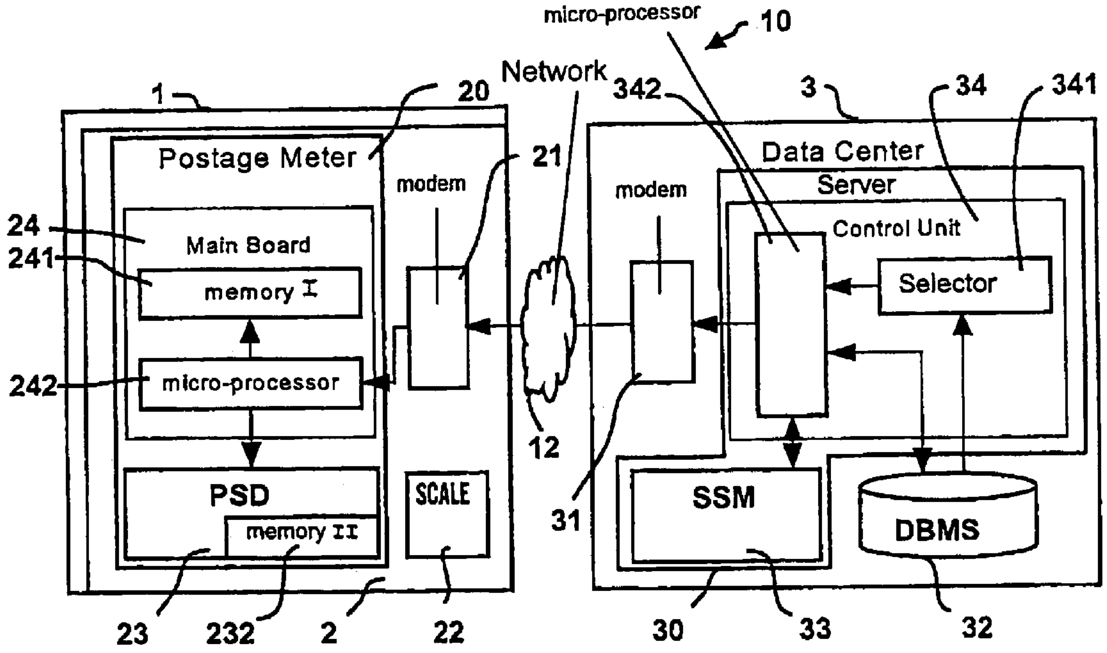
FIG. 2 is a block diagram of an arrangement to provide data with a security management for a franking system in accordance with the invention.

FIG. 2 is a block diagram for an arrangement to provide data corresponding to a security management for a franking system. In addition to a remote data center 3, the components of a franking system 1 are shown that include at least one franking machine 2 and, if applicable, a static scale 22. If applicable, further postal processing stations (not shown) can also be connected for which services can likewise be provided via the franking machine 2. The static scale 22 is preferably an optional component of the franking machine 2. The franking machine 2 has a postal meter 20 having at least one communication unit 21, a motherboard 24 and a postal security device (PSD) 23. The motherboard 24 is equipped with a first non-volatile memory 241 and with a microprocessor 242 that is operationally connected with the PSD 23, the memory 241 and the communication unit 21. The communication unit 21 is, for example, a modem that can be communicationally connected via a telephone network 12 with a modem 31 of the data center 3. Other communication means such as, for example, wireless transmitting/receiving devices, mobile radio devices, Bluetooth, WAN, LAN and other communication devices, as well as other networks such as Internet, Ethernet and others can be used. Moreover, a number of communication means and networks for data transmission may be used. The PSD 23 is connected (in a manner not shown) toner particles the motherboard 24 via an interface and contains, among other things, a second non-volatile storage 232 for accounting data and security-relevant data for a secure communication with the remote data center. Further details regarding the PSD can be learned from the European Applications 789 333, 1 035 513, 1 035 516, 1 035 517, 1 035 518, 1 063 619, 1 069 492 and 1 278 164.

The data center 3 has a server 30 that is in operation connection with at least the one server communication unit 31 and with a database management system (DBMS) 32. In a variant (not shown), the server communication unit 31 is a component of a communication server that enables a number of separate connections to the network 12. The database management system 32 can also be realized in a separate server or within the existing server 30. A control unit 34 of the server 30 is equipped with a selector 341 and with an microprocessor 342 that is operationally connected with the server security module (SSM) 33, the selector 341 and the at least one server communication unit 31. The selector 341 is realized according to hardware and/or software.

The multiple separate connections of the communication server to the network 12 enable the connection of a number of franking machines 2 or franking systems 1 with the data center 3 and to a security management system 10.

Stored at the data center 3 is a list of data sets that contain security information and information regarding associated security policies. Both items of information are typically stored in the database of a database management system (DBMS) 32. A security category, for example a number on a scale of 1 to 10, is associated in each data set with the security information.

By specifying the security category, it can optionally be determined whether the desired data set is originated in the franking system 1 from within or outside of the PSD 23, as well as in which manner the transferred data are secured given data exchange, or which elements of the franking system 1 influence the transferred data. For example, the security policy defines which elements of the franking imprint are influenced by the transferred data.

The desired data set is stored in a non-volatile memory of a franking machine of the franking system 1, within or outside of the PSD. In connection with a remote service, it may be necessary for the data to be read out from the franking system 1 and remotely transferred to the data center 3. If the data center 3 thus reads the security data from the franking system 1, by specifying a security category it can likewise be determined whether the desired data set is read from the franking system 1 from within or outside of the PSD 23. The control unit 34 of the data center 3 causes data sets to be communicated, stored and processed according to their security category. The control unit uses the selector 341 for this purpose. The latter allows one of two logical communication channels to be selected in order to determine storage in the franking system 1 within or outside of the PSD. Each logical communication channel is protected by individual security mechanisms and parameters that are applied by a component of the control unit 34. This component of the control unit 34 is also designated as a server security module (SSM) 33. For such control, the security category of a data set is taken into account. In its header, the data set contains at least the information of the associated security policy. Outside of the addressing in the franking system 1, the control unit 34 can also use this information regarding the associated security policy to select a suitable security mechanism for protection during the communication and/or during the connected storage. This is described in the examples below.

Figure 3:
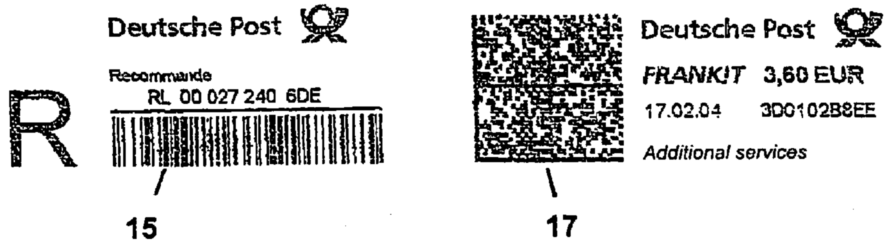
FIG. 3 shows a franking imprint according to DPAG requirements.

FIG. 3 shows a franking imprint according to the Frankit requirements of the Deutsche Post AG. At the left, the franking imprint has a one-dimensional bar code (1D barcode) 15 for an identcode, which is explained further below. In the value imprint moreover, the franking imprint contains a two-dimensional barcode (2D barcode) 17 for the verification of the proper payment of the mail piece-carrying fee.

Figure 4:
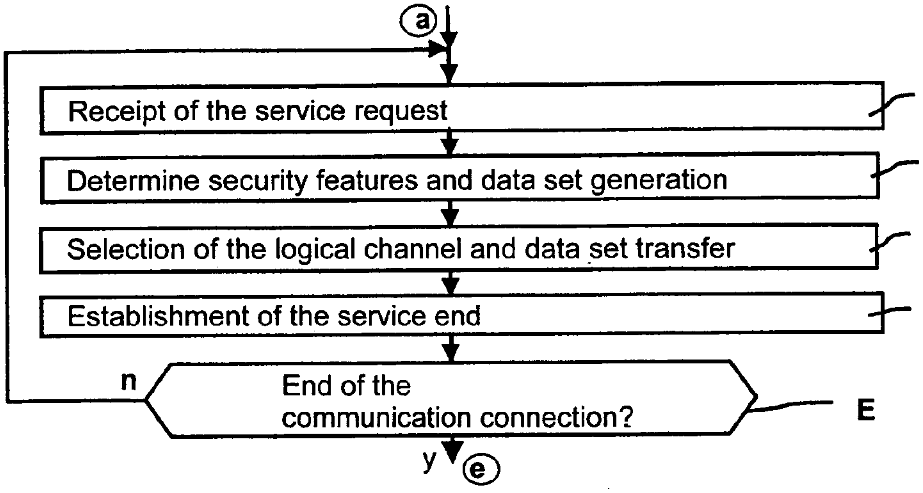
FIG. 4 is a flowchart flow plan for a server-controlled security management in accordance with the invention.

FIG. 4 shows a flowchart for server-controlled security management. In step A, the data center 3 waits for the receipt of a service request. For the processing of a remote service, the franking machine dials into the data center 3 and requests the desired remote service. After the receipt of the service request, in step B the data center determines the security features to be selected according to the security policy of this remote service. In step C, a selection of the logical channel and a data set transfer from the data center 3 to the franking machine 2 or to the franking system 1 ensues. Either the logical channel to the memory I of the motherboard or the logical channel to the memory II of the PSD is selected. The data set transfer ensues via the selected channel over the already-established modem connection from the data center 3 to the franking machine 2 or the franking system 1. In step D, the determination of the end of the requested service ensues. As soon as the remote service is ended, the server releases the logical connection to the franking machine 2 or system 1 and gives the franking machine 2 or system 1 a corresponding confirmation. In step E, it is established whether the communication connection from the franking machine 2 or system 1 has been ended. If this is the case, then the point e is reached. Otherwise, the process branches back to a starting point a before the first step A, for the reception of a further service request.

Examples for security categories are displayed in the following table:

| Security category | Protective goal | Logical channel | Storage location | Components of the franking system | Location in the imprint |
|---|---|---|---|---|---|
| IdentCodes | uniqueness/unambiguity | Plain session | Motherboard NVM | Printer activation | 1D barcode excluding value imprint |
| Price/product table (PPT) | data integrity/origin authentication/timeliness | Plain session | Motherboard NVM | Price calculation module | — |
| User profile | data integrity/origin authentication | Plain session | Motherboard NVM | Recording in NVM | — |
| PVD | protection of the fee/data integrity/origin authentication/receiver data protection | Secure session | PSD NVM | Postal register, printer activation | 2D barcode in value imprint |
| Withdraw | protection of the residual credit | Secure session | PSD NVM | Postal register | — |
| MAC key | Encryption | Secure session | PSD NVM | Key storage, stereotype checking and generation | — |

The table columns "protection goals" and "logical channel" specify, for each of the security categories cited in the first column, in which manner the transferred data are secured given the data exchange. The remaining table columns denote the storage location, the influencing components of the franking system and where in the imprint the influence is visible.

IdentCodes

IdentCodes are reference numbers that uniquely designate mail pieces as long as they have not been successfully delivered. Using its IdentCode, a mail piece can be unambiguously recognized in a mail distribution center or in the delivery. The IdentCode can be used in order to provide tracking information about mail pieces and to make it possible for the sender to make queries. During its duration of validity, each IdentCode may be assigned at most once (uniqueness) for at most one mail piece (unambiguity). The non-volatile storage on the motherboard of the franking machine is used as a storage location.

Price-Product Table

A price calculation module and the imprint are influenced by the transferred data. A price-product table (or, respectively, postage tariff table) has a date of validity from which it is valid. The entries of a price-product table should be protected against manipulation (data integrity). The source of a price-product table should be authorized (origin authentication), and a price-product table should be provided at the latest on its date of validity (timeliness). The non-volatile memory on the motherboard of the franking machine is used as a storage location.

User Profile

The user profiles are passively recorded in the machine and transferred to the data center. The entries of a user profile should be protected against manipulation (data integrity). Alternatively, an integrity protection of the entire volume of a user profile is sufficient. Moreover, the origin should be authenticated (origin authentication). This concerns a special accounting value that can be transmitted to the data center in the framework of a special service (class of mail). This special accounting value is a conventional, unprintable MAC-secured sum value of all summed postal values that have been franked during an accounting period. If the aforementioned value is printed out on a post card, this is an accounting franking. The aforementioned MAC (message authorization code) is preferably realized in the form of a CryptoTag. The non-volatile storage on the motherboard of the franking system is used as a storage location. After the transfer of the CoM data to the data center, the non-volatile storage is deleted in order to afford storage space for newly recorded data.

PVD

The data that are transferred during a credit download (postage value download) are partially relevant for remuneration. This means that when, for example, an amount of 50 € is requested and is booked and authorized in the data center, in the security module only 50 € more credit may also subsequently be present. If 100 € were to additionally arrive there, the server (thus, for example a postal authority) would be defrauded of the difference amount of 50 €. Therefore the messages that are transferred given a postage value download must be protected against manipulation and their respective data origin must be authenticated.

Here the data protection of the receiver can also be a protective goal. For example, it should not be possible for outsiders to recognize which amount a customer has just loaded from the data center. In order to achieve this protective goal, specific messages between data center and security module are encrypted. The non-volatile memory of the PSD serves as a storage location. The influenced components of the franking system are the PSD and its postal register.

Withdraw

The withdrawal of the remaining residual credit of the customer is a significant protection goal given return of a machine. The non-volatile storage of the PSD serves as a storage location. The influenced components of the franking system are the PSD and its postal register.

MACKey

It is a significant protection goal in the transfer of the MACKey to keep the key secret from outsiders (including the user of the franking machine). Therefore, this key is encrypted before the transfer and only decrypted again in the security module. The non-volatile storage of the PSD serves as a storage location. Components of the franking system such as the PSD, key storage, stereotype checking and generation in the franking machine are influenced by the transferred data.

As a logical channel, only a plain text session (plain session) is differentiated from a secure text session (secure session) as an example. Simplified, a plain session is a reliable data connection via a telephone network, in which the data are transferred without cryptographic safeguarding. If necessary, error-correcting codes can be used in order to improve the reliability of the transfer path. Due to the general high profile, a closer dealing with the specification of a plain session is superfluous.

A secure session is a reliable data connection via a telephone network, in which the data are transferred with cryptographic safeguarding. If necessary, error-correcting codes can also be used in order to improve the reliability of the transfer path.

The selector controls the selection of the channel (secured/unsecured), for example using a decision matrix that is charged with the corresponding handling manner, for example for the requested service or a message identification available for transfer. The decision matrix, for example, can be developed in the form or one or more database tables, such that changes of the channel association can be dynamically effected in the operation of the server.

Figure 5:
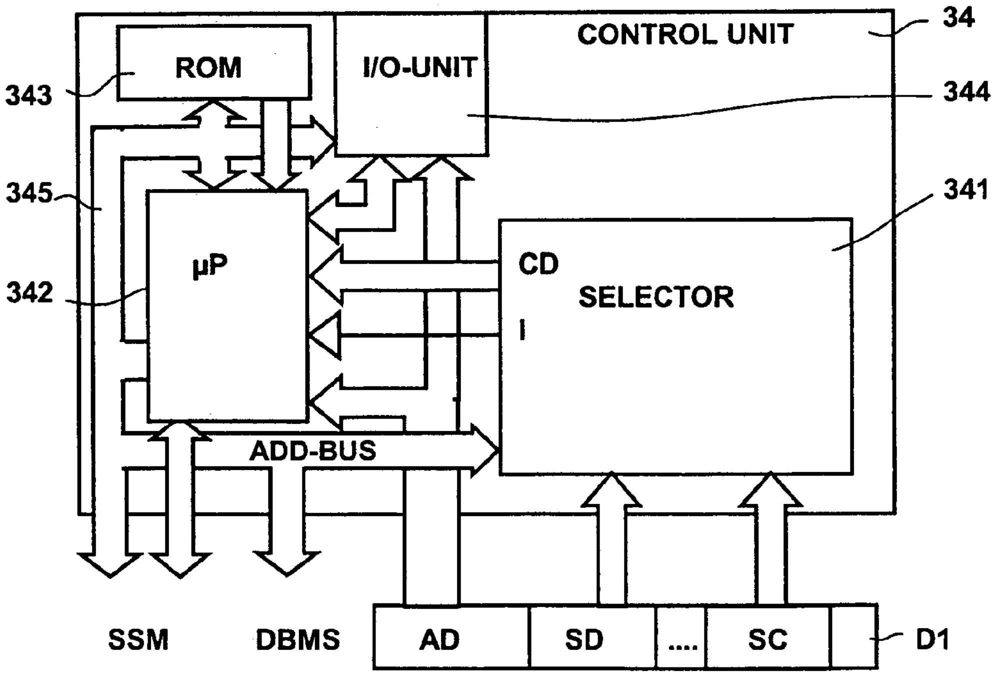
FIG. 5 is a detail of the block diagram of the control unit of the server in accordance with the invention.

FIG. 5 shows a detail of the block diagram of the control unit 34 of the server. The selector 341 is, for example, a hardware and/or software component that is provided to extract a data set D1 . . . Dn through Dx from a storage 321 of the database management system 32 and to buffer it at least in part until the processing of the data set by the microprocessor 342 in operational connection with the selector 341 has ended. The data set D1 . . . Dn through Dx has at least first data, i.e. denotes an addressable data part of the associated apparatus data and/or directly comprises application data AD. The data set furthermore includes associated security data SD as well as an association rule that references further steps, data tables or, respectively, a decision matrix, which puts the microprocessor in the position to generate as a result a selected logical channel. This association rule is also designated as a security category SC of a security policy. For this, the microprocessor 342 accesses a program stored in a program storage 343 and executes the program and the desired protocols. The first data are application data AD of the addressed data set D1 and are transferred via a bus to the microprocessor 342 or, at the lowest level of the security categories, directly to the input/output unit 344. For example, a modem can be connected to the latter. At a higher level of the security categories, when the selected buffers further security data SD and data of the security category SC that designate a predetermined security policy, an interrupt I or a control signal for the microprocessor 342 is generated that establishes the further data processing using the second data CD passed by the selector to the microprocessor. The first data transferred to the microprocessor 342 can be further dealt with and thereby be, for example, encrypted, i.e. be further dealt with corresponding to that type which the passed second (control) data CD communicates. The data set D1 shown in FIG. 5 contains data AD, SD and SC, (their sequence can be realized differently than has been described). A data set Dn preferably in its header has at least the security category SC, i.e. information regarding the associated security policy. The selector can be addressed by the microprocessor, for example via an address bus ADD-BUS 345, and the second (control) data CD passed by the selector can thus be repeatedly queried by the microprocessor. In addition to the requested first data, the data regarding the security category SC can be output by the microprocessor via input/output unit 344 in order to denote the location of the storage in the franking system 1. Only one embodiment is explained in FIG. 5, however it should not be excluded that the control unit 34 of the server is realized in part in another manner. Alternatively, the selector 341 can be executed with hardware and/or software as a component of the microprocessor 342.

The selector controls the logical channel by the use of cryptographic methods on messages or partial messages (or their omission). This means that mathematical methods of cryptography are applied to the methods of the technical transport of the information, for example, by a transfer via a modem or via another suitable server communication unit 31.

Another possibility is to couple the association of the channel, fixed to the development time, with the services or data fields, i.e. to hardwire which channel is to be used. In this case, the selector is a logical component of the process program in the server.

In general, secure channels are characterized by authentication of messages or partial messages by means of message authentication codes (MAC) that typically contain an encrypted (cryptographic) checksum. Methods such as, for example, HMAC-SHA1 provide this. Furthermore, messages or partial messages can be encrypted using cipher methods (3DES, AES). The key information used for the authentication and encryption is statically selected and, for example, applied (imprinted) during the production of the service device or is newly generated for each session on the basis of a key exchange procedure.

The identity of both communication partners can be securely determined, for example, using digital signals that are linked with one another in the sense of a shared public key hierarchy. Both entities in this case are equipped with their own key identities.

The cryptographic features of a secure channel are detailed, for example, in German patent application 10 2004 032 057.8 (not previously published) entitled: “Method and Arrangement for Generation of a Secret Session Key”.

The security information provided by the data center in the framework of a remote service can be used by the franking machine and by other devices of a franking system.

As used herein a “franking system,” encompasses a PC franker composed at least of a personal computer with PSD and a conventional office printer.

In another variant (not shown in FIG. 2), the database management system (DBMS) 32 is realized within the server 30. Moreover, the selector 341 is executed according to hardware and/or software as a component of the microprocessor 342.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for server-controlled security management of services to be performed by an electronic system, comprising the steps of:

establishing a communication connection between an electronic system and a service provider remote from said electronic system and, via said communication connection, transmitting a request for a service, as a requested service, from among a plurality of services to be performed at the electronic system, from the electronic system to the service provider, each of said services having a security category associated therewith that requires security data to satisfy the security category;

in said electronic system, providing a plurality of logic channels respectively leading to different destinations in said electronic system for respective services in said plurality of services, and securing said logic channels respectively with different security levels;

for each security category for each service available from said service provider, storing the security data required to satisfy that security category in a database at the service provider and, upon receipt of said request at said service provider, automatically identifying the security category the requested service and generating a data set containing service data for the requested service secured by the security data required to satisfy the security category of the requested service;

at the service provider, dependent on the security category associated in the database with the requested service, controlling a selector of said server to select a logical channel, from among said plurality of logical channels, that designates a destination in said electronic system for said data set that has a security level associated therewith that is compatible with the security category associated with the requested service, and transferring said data set from said service provider to said destination in said electronic system via the selected logical channel over said communication connection;

upon completion of the requested service at said electronic system, generating an authentication output at said electronic system; and at said service provider, waiting for receipt of a further service request, or said authentication output, from said electronic system.

2. A method as claimed in claim 1 wherein the step of establishing said communication connection between said electronic system and said service provider comprises automatically contacting said service provider from said electronic system to establish said communication connection.

3. A method as claimed in claim 1 wherein said electronic system contains a secured storage location, and comprising designating, in the respective security category for each service, whether the security data for the service should be stored, at said destination, within said secured storage location or outside of said secured storage location.

4. A method as claimed in claim 1 wherein said electronic system supports a plurality of communication security mechanism, and comprising, in the respective security category for said service, specifying one of said communication security mechanism at said destination for said security data.

5. A method as claimed in claim 1 wherein said electronic system comprises a plurality of components, and comprising, in the respective security category for said service, specifying, at said destination, at least one of said components of said electronic system that will be influenced by said security data.

6. An arrangement for security management of services provided to an electronic system by a service provider remote from the electronic system, comprising:

an electronic system and a service provider remote from said electronic system;

an arrangement establishing a communication connection between said electronic system and said service provider allowing transmittal of a request for a service, as a requested service, from among a plurality of services, to be performed at the electronic system, from the electronic system to the service provider, each of said services having a security category associated therewith that requires security data to satisfy the security category;

said electronic system comprising a plurality of logic channels respectively leading to different destinations in said electronic system for respective services in said plurality of services, and securing said logic channels respectively with different security levels;

a database at said service provider wherein, for each security category for each service available from said service provider, the security data are stored that are associated with that that security category;

a server at said service provider that upon receipt of said request at said service provider, automatically identifies the security level of the requested service and generates a data set containing service data for the requested service secured by the security data required to satisfy the security category of the requested service;

a selector at said service provider controlled dependent on the security category associated in the database with the requested service, to select a logical channel, from among said plurality of logical channels, that designates a destination in said electronic system for said data set that has a security level associated therewith that is compatible with the security category associated with the requested service, and to transfer said data set from said service provider to said destination in said electronic system via the selected logical channel over said communication connection;

said electronic system, upon completion of the requested service at said electronic system, generating an authentication output at said electronic system; and said service provider waiting for receipt of a further service request, or said authentication output, from said electronic system.

7. An arrangement as claimed in claim 6 wherein said electronic system is a franking system containing a postal security device and wherein said service provider is a data center, and wherein said franking system comprises a first memory, and a second memory, with only said second memory being contained in said postal security device, and wherein said security category stored in said database at said data center designates one of said first memory or said second memory at said destination, dependent on said security policy.

8. An arrangement as claimed in claim 7 wherein said data set additionally contains application data, and wherein said franking system comprises a franking machine, containing said postal security device, and a further unit connected externally to said franking machine, said further unit containing a third memory, and wherein said application data are stored in said third memory.

9. An arrangement as claimed in claim 6 wherein said server comprises a server communication unit participating in said communication connection between said service provider and said electronic system.

10. An arrangement as claimed in claim 6 wherein said server communication unit allows a plurality of separate connections to a network, as said communication link, between said service provider and said electronic system.

11. An arrangement as claimed in claim 6 wherein said communication connection is a wireless communication link.

12. An arrangement as claimed in claim 6 wherein said communication connection comprises a modern.

13. An arrangement as claimed in claim 6 wherein the database management system runs on a dedicated database server.

14. An arrangement as claimed in claim 6 wherein said server is a general-purpose server for said service provider.

15. An arrangement as claimed in claim 6 wherein selector is a hardware-based selector.

16. An arrangement as claimed in claim 6 wherein said selector is a software-based selector.

17. An arrangement as claimed in claim 6 wherein said service provider comprises a microprocessor having access to said database, and wherein said selector is a component of said microprocessor.

* * * * *